(12) United States Patent
McGary

(10) Patent No.: US 12,542,678 B2
(45) Date of Patent: Feb. 3, 2026

(54) SYSTEM, METHOD, AND COMPUTER PROGRAM FOR DYNAMIC OPTIMIZATION OF CRYPTOGRAPHIC OPERATIONS

(71) Applicant: TOYOTA JIDOSHA KABUSHIKI KAISHA, Toyota (JP)

(72) Inventor: Caleb McGary, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 18/490,279

(22) Filed: Oct. 19, 2023

(65) Prior Publication Data
US 2025/0132922 A1  Apr. 24, 2025

(51) Int. Cl.
*H04L 29/06* (2006.01)
*H04L 9/08* (2006.01)
*H04L 9/32* (2006.01)

(52) U.S. Cl.
CPC .......... *H04L 9/3242* (2013.01); *H04L 9/0819* (2013.01)

(58) Field of Classification Search
CPC . H04L 9/3242; H04L 9/0819; H04L 63/0428; H04L 9/0897; H04L 2209/12; H04L 2209/122; H04L 2209/127; G06F 21/602
See application file for complete search history.

(56) References Cited

U.S. PATENT DOCUMENTS

| 2010/0002869 | A1* | 1/2010 | Torai | H04L 9/0631 |
| | | | | 380/28 |
| 2012/0320967 | A1* | 12/2012 | Gao | G10L 25/69 |
| | | | | 375/E7.126 |
| 2018/0103018 | A1* | 4/2018 | Chauhan | H04L 63/0485 |
| 2020/0349268 | A1 | 11/2020 | Ahn et al. | |
| 2021/0279567 | A1* | 9/2021 | Koenning | G06F 17/18 |
| 2022/0365804 | A1 | 11/2022 | Delahais et al. | |

FOREIGN PATENT DOCUMENTS

| JP | 2003-069555 A | | 3/2003 |
| JP | 2009122925 A | * | 6/2009 |
| JP | 2019-096045 A | | 6/2019 |

OTHER PUBLICATIONS

Machine Translation of JP-2009122925-A (Year: 2009).*

* cited by examiner

*Primary Examiner* — Yogesh Paliwal
(74) *Attorney, Agent, or Firm* — Sughrue Mion, PLLC

(57) ABSTRACT

Provided are a system, method, and device for optimizing cryptographic operations. According to embodiments, the system may include: a memory storage storing computer-executable instructions; and at least one processor communicatively coupled to the memory storage, wherein the at least one processor may be configured to execute the instructions to: determine an amount of time for performing one or more types of cryptographic operations in a software of the system, a hardware of the system, and a combination of the software and the hardware; and determine, for each of the one or more types of cryptographic operations, whether a respective one of the one or more types of cryptographic operations should be performed in the software, the hardware, or the combination of the software and the hardware based on the determined amount of time.

17 Claims, 7 Drawing Sheets

SYSTEM, METHOD, AND COMPUTER PROGRAM FOR DYNAMIC OPTIMIZATION OF CRYPTOGRAPHIC OPERATIONS

TECHNICAL FIELD

Systems, methods, and computer programs consistent with example embodiments of the present disclosure relate to software security, and more specifically, relate to dynamic optimization of cryptographic operations.

BACKGROUND

Cryptographic operations may refers to operations performed for data encryption, authentication, and digital signatures using cryptographic algorithms. In the related art, cryptographic operations may be preconfigured to be performed entirely in software, hardware, or a combination of the software and hardware.

Nevertheless, the above approach for performing cryptographic operations in the related art may have at least the following shortcomings.

In certain systems, certain cryptographic operations may be performed faster in hardware than in software, and vice versa. For example, in a System On Chip (SoC) which provides several integrated hardware accelerators, hardware features, and support capabilities, each of said hardware features of the SoC may perform an operation at different clock speed based on different conditions and capabilities of the associated hardware. As such, computationally intensive cryptographic operations, such as encryption of a large piece of data, in such SoC may be slower when performed in hardware than when performed in software.

Accordingly, there is a need to dynamically optimize cryptographic operations by dynamically determining whether to perform a cryptographic operation in software, hardware, or the combination of the software and hardware.

SUMMARY

Example embodiments of the present disclosure dynamically optimize cryptographic operations by dynamically determining whether to perform a cryptographic operation in software, hardware, or the combination of the software and hardware. As such, example embodiments of the present disclosure improve efficiency, speed, and security of cryptographic operation.

According to embodiments, a system is provided. The system may include: a memory storage storing computer-executable instructions; and at least one processor communicatively coupled to the memory storage, wherein the at least one processor may be configured to execute the instructions to: determine an amount of time for performing one or more types of cryptographic operations in a software of the system, a hardware of the system, and a combination of the software and the hardware; and determine, for each of the one or more types of cryptographic operations, whether a respective one of the one or more types of cryptographic operations should be performed in the software, the hardware, or the combination of the software and the hardware based on the determined amount of time for performing the respective one of the one or more types of cryptographic operations.

According to embodiments, the one or more types of cryptographic operations may include a cryptographic operation executing an encryption algorithm, a cryptographic operation executing a decryption algorithm, a cryptographic operation executing a hash algorithm, a cryptographic operation executing a derive key algorithm, and a cryptographic operation executing a generate algorithm.

According to embodiments, the amount of time may be determined for each of the one or more types of cryptographic operations at a plurality of sizes of input data.

According to embodiments, the at least one processor may be configured to execute the instructions to determine whether the respective one of the one or more types of cryptographic operations should be performed in the software, the hardware, or the combination of the software and the hardware by: comparing, for each of the one or more types of cryptographic operations at each of the plurality of sizes of input data, a first amount of time for performing the respective one of the one or more types of cryptographic operations in the software of the system, with a second amount of time for performing the respective one of the one or more types of cryptographic operations in the hardware, and with a third amount of time for performing the respective one of the one or more types of cryptographic operations in the combination of the software and the hardware; and determining, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

According to embodiments, the at least one processor may be further configured to execute the instructions to store results of the determining whether the respective one of the one or more types of cryptographic operations should be performed in the software, the hardware, or the combination of the software and the hardware.

According to embodiments, the at least one processor may be further configured to execute the instructions to determine whether to perform a cryptographic operation in the software, the hardware, or the combination of the software and the hardware, based on at least a type of the cryptographic operation, a size of input data, and the stored results.

According to embodiments, the at least one processor may be further configured to execute the instructions to perform a cryptographic operation in the software, the hardware, or the combination of the software and the hardware under a Trusted Execution Environment (TEE).

According to embodiments, a method is provided. The method may include: determining an amount of time for performing one or more types of cryptographic operations in a software of the system, a hardware of the system, and a combination of the software and the hardware; and determining, for each of the one or more types of cryptographic operations, whether a respective one of the one or more types of cryptographic operations should be performed in the software, the hardware, or the combination of the software and the hardware based on the determined amount of time for performing the respective one of the one or more types of cryptographic operations.

According to embodiments, the one or more types of cryptographic operations may include a cryptographic operation executing an encryption algorithm, a cryptographic operation executing a decryption algorithm, a cryptographic operation executing a hash algorithm, a cryptographic operation executing a derive key algorithm, and a cryptographic operation executing a generate algorithm.

According to embodiments, the amount of time may be determined for each of the one or more types of cryptographic operations at a plurality of sizes of input data.

According to embodiments, the determining whether the respective one of the one or more types of cryptographic operations should be performed in the software, the hardware, or the combination of the software and the hardware may include: comparing, for each of the one or more types of cryptographic operations at each of the plurality of sizes of input data, a first amount of time for performing the respective one of the one or more types of cryptographic operations in the software of the system, with a second amount of time for performing the respective one of the one or more types of cryptographic operations in the hardware, and with a third amount of time for performing the respective one of the one or more types of cryptographic operations in the combination of the software and the hardware; and determining, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

According to embodiments, the method may further include storing results of the determining whether the respective one of the one or more types of cryptographic operations should be performed in the software, the hardware, or the combination of the software and the hardware.

According to embodiments, the method may further include determining whether to perform a cryptographic operation in the software, the hardware, or the combination of the software and the hardware, based on at least a type of the cryptographic operation, a size of input data, and the stored results.

According to embodiments, the method may further include performing a cryptographic operation in the software, the hardware, or the combination of the software and the hardware under a Trusted Execution Environment (TEE).

According to embodiments, a non-transitory computer-readable recording medium is provided. The non-transitory computer-readable recording medium may have recorded thereon instructions executable by at least one processor of a system to cause the at least one processor to perform a method including: determining an amount of time for performing one or more types of cryptographic operations in a software of the system, a hardware of the system, and a combination of the software and the hardware; and determining, for each of the one or more types of cryptographic operations, whether a respective one of the one or more types of cryptographic operations should be performed in the software, the hardware, or the combination of the software and the hardware based on the determined amount of time for performing the respective one of the one or more types of cryptographic operations.

According to embodiments, the one or more types of cryptographic operations may include a cryptographic operation executing an encryption algorithm, a cryptographic operation executing a decryption algorithm, a cryptographic operation executing a hash algorithm, a cryptographic operation executing a derive key algorithm, and a cryptographic operation executing a generate algorithm.

According to embodiments, the amount of time may be determined for each of the one or more types of cryptographic operations at a plurality of sizes of input data.

According to embodiments, the determining whether the respective one of the one or more types of cryptographic operations should be performed in the software, the hardware, or the combination of the software and the hardware may include: comparing, for each of the one or more types of cryptographic operations at each of the plurality of sizes of input data, a first amount of time for performing the respective one of the one or more types of cryptographic operations in the software of the system, with a second amount of time for performing the respective one of the one or more types of cryptographic operations in the hardware, and with a third amount of time for performing the respective one of the one or more types of cryptographic operations in the combination of the software and the hardware; and determining, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

According to embodiments, the method may further include storing results of the determining whether the respective one of the one or more types of cryptographic operations should be performed in the software, the hardware, or the combination of the software and the hardware.

According to embodiments, the method may further include determining whether to perform a cryptographic operation in the software, the hardware, or the combination of the software and the hardware, based on at least a type of the cryptographic operation, a size of input data, and the stored results.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
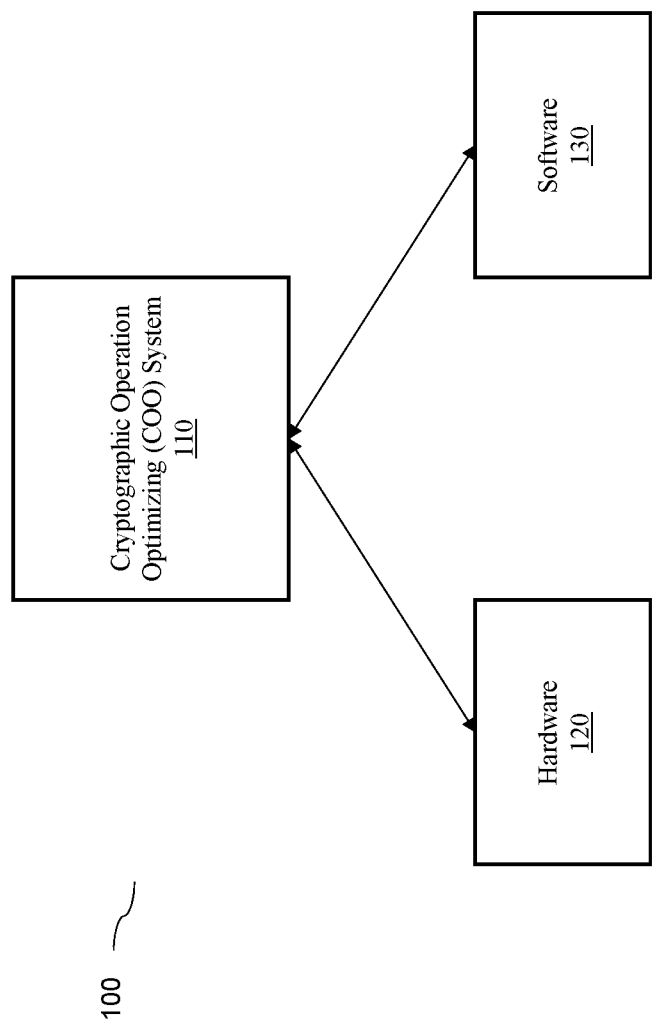
FIG. 1 illustrates a block diagram of an example system configuration for optimizing cryptographic operations, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure dynamically optimize cryptographic operations by dynamically determining whether to perform a cryptographic operation in software, hardware, or the combination of the software and hardware.

According to embodiments, the system may determine an amount of time for performing a type of cryptographic operation in a software, a hardware, and a combination of the software and the hardware, determine whether said type of cryptographic operation should be performed in the software, the hardware, or the combination of the software and the hardware, and store the results of such determination. Subsequently, at a later time, the system may determine whether to perform a cryptographic operation of the same type in the software, the hardware, or the combination of the software and the hardware, based on the stored results.

Ultimately, example embodiments of the present disclosure dynamically optimize cryptographic operations by dynamically determining whether to perform a cryptographic operation in software, hardware, or the combination of the software and hardware, which improves efficiency, speed, and security of cryptographic operations.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

FIG. 1 illustrates a block diagram of an example system configuration 100 for optimizing cryptographic operations, according to one or more embodiments. As illustrated in FIG. 1, system configuration 100 may include a Cryptographic Operation Optimization (COO) System 110, a hardware 120, and a software 130.

COO system 110 may include a system, a platform, a module, or the like, which may be configured to perform one or more operations or actions for optimizing cryptographic operations. According to embodiments, the COO system 110 may be associated with the hardware 120 and the software 130. According to embodiments, the COO system 110, the hardware 120, and the software 130 may be comprised in a system capable of performing cryptographic operations, such as a vehicle capable of performing cryptographic operations in order to validate its hardware and software (i.e., the hardware 120, and the software 130).

Example operations performable by the COO system 110 for optimizing cryptographic operations are described below with reference to FIG. 3 to FIG. 6. Further, several example components which may be included in the COO system 110, according to one or more embodiments, are described below with reference to FIG. 2.

Figure 2:
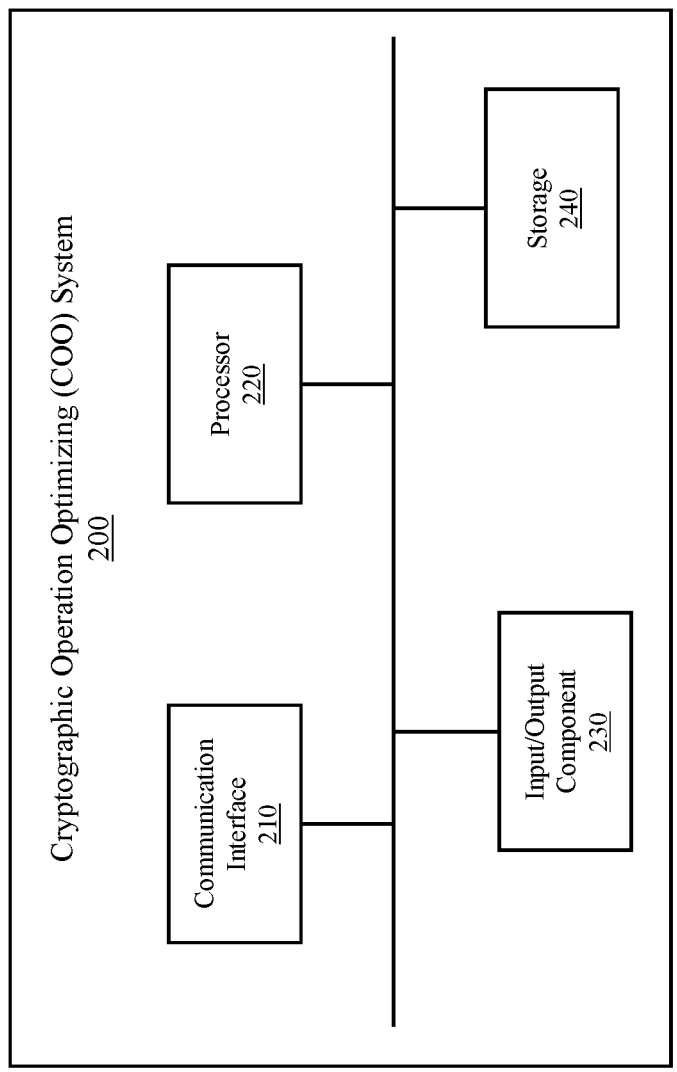
FIG. 2 illustrates a block diagram of example components in a Cryptographic Operation Optimization (COO) System, according to one or more embodiments.

FIG. 2 illustrates a block diagram of example components in a COO system 200, according to one or more embodiments. The COO system 200 may corresponds to the COO system 110 in FIG. 1, thus the features associated with the COO system 110 and the COO system 200 may be similarly applicable to each other, unless being explicitly described otherwise.

As illustrated in FIG. 2, the COO system 200 may include at least one communication interface 210, at least one processor 220, at least one input/output component 230, and at least one storage 240, although it can be understood that the COO system 200 may include more or less components than as illustrated in FIG. 2, and/or may be arranged in a manner different from as illustrated in FIG. 2, without departing from the scope of the present disclosure.

The communication interface 210 may include at least one transceiver-like component (e.g., a transceiver, a separate receiver and transmitter, a bus, etc.) that enables the components of the COO system 200 to communicate with each other and/or to communicate with one or more components external to the COO system 200, such as via a wired connection, a wireless connection, or a combination of wired and wireless connections.

For instance, the communication interface 210 may couple the processor 220 to the storage 240 to thereby enable them to communicate and to interoperate with each other in performing one or more operations.

According to one or more embodiments, the communication interface 210 may include one or more application programming interfaces (APIs) which allow the COO system 200 (or one or more components included therein) to communicate with one or more software applications.

The input/output component 230 may include at least one component that permits the COO system 200 to receive information and/or to provide output information. It can be understood that, in some embodiments, the input/output component 230 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 240 may include one or more storage mediums suitable for storing data, information, and/or computer-executable instructions therein. According to embodiments, the storage 240 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 240 may be configured to store information, such as raw data, metadata, or the like. Additionally or alternatively, the storage 240 may be configured to store one or more information associated with one or more operations performed by the processor 220. For instance, the storage 240 may store information defining the historical operation(s) performed by the processor 220 to optimize cryptographic operations, one or more results of operations performed by the processor 220, or the like. Further, the storage 240 may store data or information required in optimizing cryptographic operations. For instance, the storage 240 may store at least one calibration file (described below with reference to FIG. 5).

In some implementation, the storage 240 may include a plurality of storage mediums, and the storage 240 may be configured to store a duplicate or a copy of at least a portion of the information in the plurality of storage mediums, for providing redundancy and for backing-up the information or the associated data. Furthermore, the storage 240 may also store computer-readable or computer-executable instructions which, when being executed by one or more processors (e.g., processor 220), causes the one or more processors to perform one or more actions/operations described herein The processor 220 may include at least one processor capable of being programmed or being configured to perform a function(s) or an operation(s) described herein. For instance, the processor 220 may be configured to execute computer-executable instructions stored in at least one storage medium or a memory storage (e.g., storage 240, etc.) to thereby perform one or more actions or one or more operations described herein.

According to embodiments, the processor 220 may be configured to receive (e.g., via the communication interface 210, via the input/output component 230, etc.) one or more signals and/or one or more user inputs defining one or more instructions for performing one or more operations. Further, the processor 220 may be implemented in hardware, firmware, or a combination of hardware and software. For instance, processor 220 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to collect, to extract, and/or to receive one or more information (in the form of signal or data, etc.), and to process the received one or more information to thereby optimize cryptographic operations.

Descriptions of several example operations which may be performed by the processor 220 are provided below with reference to FIG. 3 to FIG. 6.

Example Operations for Optimizing Cryptographic Operation in the Present Disclosure In the following, several example operations performable by the COO system of the present disclosure are described with reference to FIG. 3 to FIG. 6.

Figure 3:
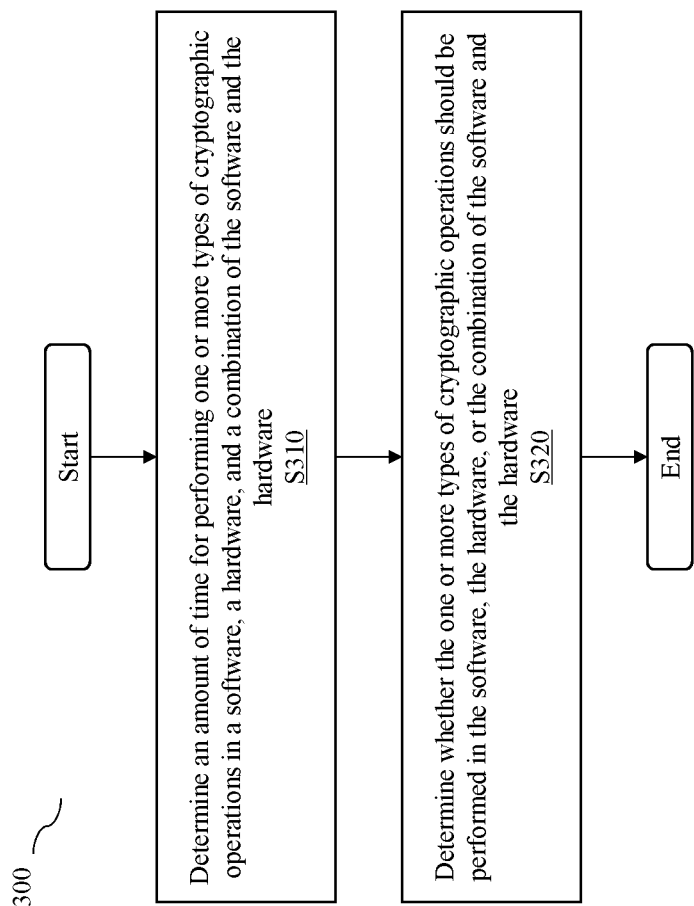
FIG. 3 illustrates a flow diagram of an example method for optimizing cryptographic operations, according to one or more embodiments.

FIG. 3 illustrates a flow diagram of an example method 300 for optimizing cryptographic operations, according to one or more embodiments. One or more operations in method 300 may be performed by at least one processor (e.g., processor 220) of the COO system.

As illustrated in FIG. 3, at operation S310, the at least one processor may be configured to determine an amount of time for performing one or more types of cryptographic operations in a software, a hardware, and a combination of the software and the hardware.

According to embodiments, a cryptographic operation may refer to an operation that executes a type of cryptographic algorithm, such as encryption algorithm, decryption algorithm, hash algorithm, derive key algorithm, generate algorithm, and the like. For example, cryptographic operation executing an encryption algorithm may receive an input data, cryptographically encrypt such input data, and provide a cryptographically encrypted data.

As such, according to embodiments, the one or more types of cryptographic operations may include a cryptographic operation executing an encryption algorithm, a cryptographic operation executing a decryption algorithm, a cryptographic operation executing a hash algorithm, a cryptographic operation executing a derive key algorithm, a cryptographic operation executing a generate algorithm, and the like.

According to embodiments, the software and hardware may refer to the software and hardware associated with the COO system, which may be comprised in a system capable of performing cryptographic operations. For example, the COO system may be comprised in a vehicle, where the hardware may refer to Core Processing Unit (CPU), hardware features, and the like of a System on Chip (SoC) in the vehicle, and the software may refer to software libraries and the like installed in such hardware. It may be understood that in such vehicle, for example, cryptographic operations may be performed in order to validate and attest the components installed in the vehicle. Accordingly, it may be understood that the at least one processor may be configured to determine the amount of time for performing the one or more types of cryptographic operations based on the software and the hardware currently installed in the vehicle.

It may be understood that the amount of time for performing a cryptographic operation may vary depending on at least the type of the cryptographic operation, the size of the input data that is to be processed by the cryptographic operation, and the location which the cryptographic operation is being performed (i.e., the software, the hardware, and the combination of the software and the hardware).

As such, according to embodiments, the at least one processor may be configured to determine the amount of time for performing each of the one or more types of cryptographic operations in the software, the amount of time for performing each of the one or more types of cryptographic operations in the hardware, and the amount of time for performing each of the one or more types of cryptographic operations in the combination of the software and the hardware. According to embodiments, the amount of time may be determined for each of the one or more types of cryptographic operations at a plurality of sizes of input data. Examples of operations for determining the amount of time for performing the one or more types of cryptographic operations are described below with reference to FIG. 4.

It may be understood that, for cryptographic operations performed at a combination of software and hardware, specific functions of the cryptographic operations may be split between the software and the hardware as appropriate. For example, for AES-CCM, the blockchaining may be done in the software, while the hardware may be used for the AES. The method then proceeds to operation S320.

At operation S320, the at least one processor may be configured to determine whether the one or more types of cryptographic operations should be performed in the software, the hardware, or the combination of the software and the hardware. According to embodiments, the at least one processor may be configured to determine, for each of the one or more types of cryptographic operations, whether a respective one of the one or more types of cryptographic operations should be performed in the software, the hardware, or the combination of the software and the hardware based on the determined amount of time for performing the respective one of the one or more types of cryptographic operations. According to embodiments, the at least one processor may be configured to determine, for each of the one or more types of cryptographic operations at each of the plurality of sizes of input data, whether the respective one of the one or more types of cryptographic operations should be performed in the software, the hardware, or the combination of the software and the hardware based on the determined amount of time for performing the respective one of the one or more types of cryptographic operations.

For example, based on the determined amount of time for performing the cryptographic operation executing the encryption algorithm in the software, the hardware, and the combination of the software and the hardware (i.e., amount of time determined during operation S310), the at least one processor may be configured to determine that the cryptographic operation executing the encryption algorithm should be performed in the software.

Similarly, for example, based on the determined amount of time for performing the cryptographic operation executing the encryption algorithm at 10 megabyte size of input data in the software, the hardware, and the combination of the software and the hardware (i.e., amount of time determined during operation S310), the at least one processor may be configured to determine that the cryptographic operation executing the encryption algorithm with 10 megabyte size of input data should be performed in the software.

Examples of operations for determining whether a type of cryptographic operation should be performed in the software, the hardware, or the combination of the software and the hardware are described below with reference to FIG. 5.

Upon performing operation S320, the method 300 may be ended or be terminated. Alternatively, method 300 may return to operation S310, such that the at least one processor may be configured to repeatedly perform, for at least a predetermined amount of time, the determining the amount of time for performing the one or more types of cryptographic operations (at operation S310) and the determining whether the type of cryptographic operation should be performed in the software, the hardware, or the combination of the software and the hardware (at operation S320).

For instance, the hardware of the vehicle may be changed, such that the determined amount of time for performing the one or more types of cryptographic operations (which was determined based on the previous hardware), may no longer be accurate for the vehicle having the new hardware. As such, the at least one processor may restart the determining the amount of time for performing the one or more types of cryptographic operations (at operation S310) and the determining whether the type of cryptographic operation should be performed in the software, the hardware, or the combination of the software and the hardware (at operation S320).

Although the above descriptions pertain to evaluation of speed (i.e., amount of time) for performing the cryptographic operations, it may be understood that other parameters related to cryptographic operations may also be evaluated, such as accuracy, collision resistance, and the like.

Figure 4:
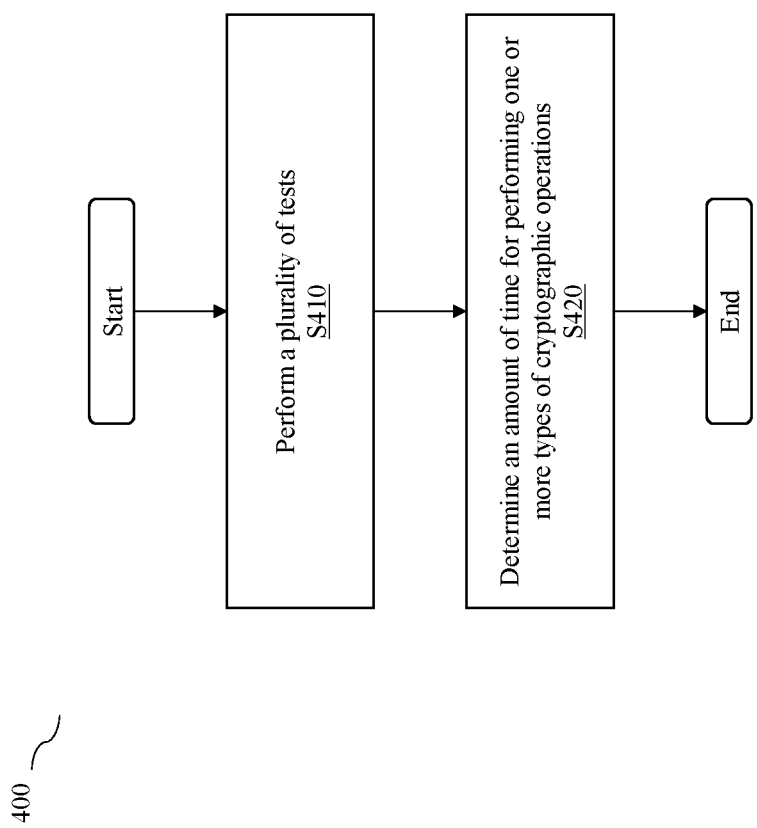
FIG. 4 illustrates a flow diagram of an example method for determining an amount of time for performing one or more types of cryptographic operations in a software, a hardware, and a combination of the software and the hardware, according to one or more embodiments.

Example Operations for Determining an Amount of Time for Performing One or More Types of Cryptographic Operations in the Present Disclosure FIG. 4 illustrates a flow diagram of an example method 400 for determining an amount of time for performing one or more types of cryptographic operations in a software, a hardware, and a combination of the software and the hardware, according to one or more embodiments. One or more operations of method 400 may be part of operation S310 in method 300, and may be performed by at least one processor (e.g., processor 220) of the COO system.

As illustrated in FIG. 4, at operation S410, the at least one processor may be configured to perform a plurality of tests. According to embodiments, the at least one processor may be configured to perform the plurality of tests by performing each of the one or more types of cryptographic operations with a plurality of sizes of input data in the software, performing each of the one or more types of cryptographic operations with the plurality of sizes of input data in the hardware, and performing each of the one or more types of cryptographic operations with the plurality of sizes of input data in the combination of the software and the hardware.

According to embodiments, each of the one or more types of cryptographic operations may be performed with blocks of data of different sizes, ranging from extra-small to extra-large, where uniform block sizes are used initially and then non-uniform block sizes are used next. According to embodiments, the plurality of sizes of input data may include sizes of input data that increase incrementally (e.g., the input data may have sizes of 1 megabyte, 2 megabyte, 3 megabyte, and the like with 1 megabyte increments).

For example, the at least one processor may be configured to perform the cryptographic operation executing the encryption algorithm with input data of 1 megabyte in the software, and then repeat the process with increasing size of input data by 1 megabyte increments. The at least one processor may be configured to perform the cryptographic operation executing the encryption algorithm in the hardware and in the combination of the software and the hardware in the similar manner. The at least one processor may then repeat the process for each of the one or more types of cryptographic operations. The method then proceeds to operation S420.

It may be understood that the at least one processor may also be configured to obtain any additional data required in order to perform the tests. For example, the at least one processor may be configured to obtain a configuration file, specifying a hardware application programming interface (API) list which includes parameters specifying what kind of cryptographic operations can be performed by the hardware of the system. The hardware API list may be provided by the manufacturer of the hardware. As another example, the at least one processor may be configured to obtain a list of what the software libraries support as part of the software install.

At operation S420, the at least one processor may be configured to determine an amount of time for performing the one or more types cryptographic operations. According to embodiments, the at least one processor may be configured to determine an amount of time for performing each of the one or more types of cryptographic operations with the plurality of sizes of input data in the software, determine an amount of time for performing each of the one or more types of cryptographic operations with the plurality of sizes of input data in the hardware, and determine an amount of time for performing each of the one or more types of cryptographic operations with the plurality of sizes of input data in the combination of the software and the hardware. According to embodiments, the at least one processor may be configured to determine the amount of time for performing each of the one or more types of cryptographic operations with the plurality of sizes by measuring the amount of time for performing the respective one of the one or more types of cryptographic operations with the plurality of sizes of input data during operation S410.

For example, after the at least one processor performed the cryptographic operation executing the encryption algorithm with input data of 1 megabyte in the software during operation S410, the at least one processor may be configured to measure the amount of time for performing said cryptographic operation executing the encryption algorithm with input data of 1 megabyte in the software. The at least one processor may then repeat the process when the cryptographic operation executing the encryption algorithm is performed with increasing size of input data by 1 megabyte increments, as well as when the cryptographic operation executing the encryption algorithm is performed in the hardware and in the combination of the software and the hardware. The at least one processor may then repeat the process for each of the one or more types of cryptographic operations.

According to embodiments, the at least one processor may be configured to create (plot) one or more graphs based on the determined amount of time. According to embodiments, the one or more graphs may specify the relationship between the amount of time for performing each of the one or more types of cryptographic operations and the plurality of sizes of input data in the software, the relationship between the amount of time for performing each of the one or more types of cryptographic operations and the plurality of sizes of input data in the hardware, and the relationship between the amount of time for performing each of the one or more types of cryptographic operations and the plurality of sizes of input data in the combination of the software and the hardware.

For example, the at least one processor may be configured to create a graph for cryptographic operation executing the encryption algorithm in the software, where such graph may indicate the amount of time for performing the cryptographic operation executing the encryption algorithm in the software against the input data sizes. The at least one processor may also be configured to calculate an equation for the plotted graph.

Figure 5:
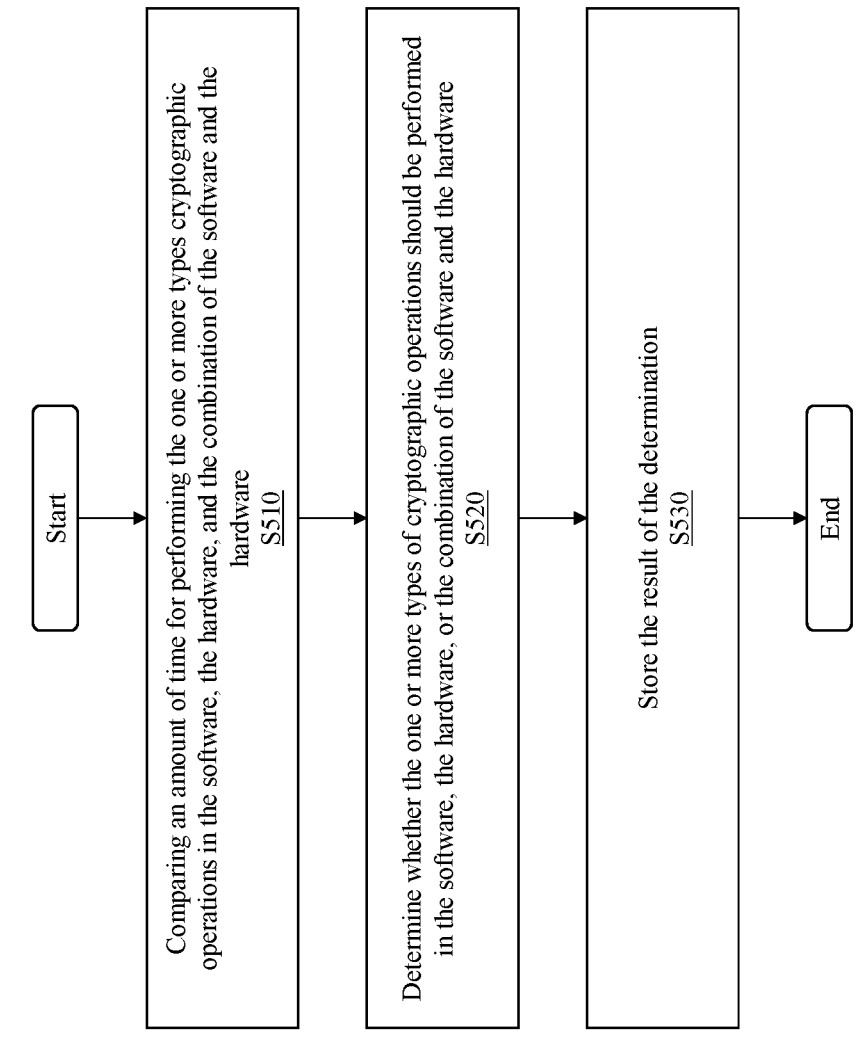
FIG. 5 illustrates a flow diagram of an example method for determining whether a type of cryptographic operation should be performed in the software, the hardware, or the combination of the software and the hardware, according to one or more embodiments.

Example Operations for Determining Whether a Type of Cryptographic Operation Should be Performed in the Software, the Hardware, or the Combination of the Software and the Hardware in the Present Disclosure FIG. 5 illustrates a flow diagram of an example method 500 for determining whether a type of cryptographic operation should be performed in the software, the hardware, or the combination of the software and the hardware, according to one or more embodiments. One or more operations of method 500 may be part of operation S320 in method 300, and may be performed by at least one processor (e.g., processor 220) of the COO system.

As illustrated in FIG. 5, at operation S510, the at least one processor may be configured to compare an amount of time for performing the one or more types cryptographic operations in the software, the hardware, and the combination of the software and the hardware. According to embodiments, the amount of time for performing the one or more types cryptographic operations may refer to the amount of time determined during operation S420 in method 400.

According to embodiments, the at least one processor may be configured to compare, for each of the one or more types of cryptographic operations at each of the plurality of sizes of input data, a first amount of time for performing the respective one of the one or more types of cryptographic operations in the software of the system, with a second amount of time for performing the respective one of the one or more types of cryptographic operations in the hardware, and with a third amount of time for performing the respective one of the one or more types of cryptographic operations in the combination of the software and the hardware.

For example, after performing operations S410 and S420 in method 400, the at least one processor may determine that: the amount of time for performing the cryptographic operation executing the encryption algorithm with input data of 1 megabyte in the software (i.e., first amount of time) is 10 seconds; the amount of time for performing the cryptographic operation executing the encryption algorithm with input data of 1 megabyte in the hardware (i.e., second amount of time) is 20 seconds; and the amount of time for performing the cryptographic operation executing the encryption algorithm with input data of 1 megabyte in the combination of the software and the hardware (i.e., third amount of time) is 15 seconds. Subsequently, the at least one processor may be configured to compared said 10 seconds, 20 seconds, and 15 seconds to each other. The at least one processor may then repeat the process for each of the one or more types of cryptographic operations at each of the plurality of sizes of input data. The method then proceeds to operation S520.

At operation S520, the at least one processor may be configured to determine whether the one or more types of cryptographic operations should be performed in the software, the hardware, or the combination of the software and the hardware. According to embodiments, the at least one processor may be configured to determine whether the type of cryptographic operation should be performed in the software, the hardware, or the combination of the software and the hardware based on the first amount of time, the second amount of time, and the third amount of time. According to embodiments, the at least one processor may be configured to determine, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

For example, the at least one processor may be configured to determine whether the cryptographic operation executing the encryption algorithm with input data of 1 megabyte should be performed in the software, the hardware, or the combination of the software and the hardware based on which of the 10 seconds (i.e., first amount of time), 20 seconds (i.e., the second amount of time), and 15 seconds (i.e., the third amount of time) has a lowest value. Accordingly, since the first amount of time has the lowest value, the at least one processor may be configured to determine that the cryptographic operation executing the encryption algorithm with input data of 1 megabyte should be performed in the software. The at least one processor may then repeat the process for each of the one or more types of cryptographic operations at each of the plurality of sizes of input data. The method then proceeds to operation S530.

At operation S530, the at least one processor may be configured to store the result of the determination (i.e., the determination made during operation S520) in a memory of the system. According to embodiments, the at least one processor may be configured to store the result of the determination in a calibration file. It may be understood that the calibration file may refer to the file containing calibration parameters, which are input into a compiled software as defined in the ISO26262 standard definitions.

For example, the at least one processor may be configured to specify in the calibration file that the cryptographic operation executing the encryption algorithm with input data of 1 megabyte should be performed in the software, the cryptographic operation executing the encryption algorithm with input data of 5 megabyte should be performed in the hardware, the cryptographic operation executing the decryption algorithm with input data of 1 megabyte should be performed in the software, and the like.

To this end, the COO system may be able to determine, in a safety critical manner, the most optimal location for performing cryptographic operations, given the currently installed hardware and software, the type of the cryptographic operation, and the size of the input data. Further, the COO system may also be able to define an upper bound of execution time based on the stored results.

Figure 6:
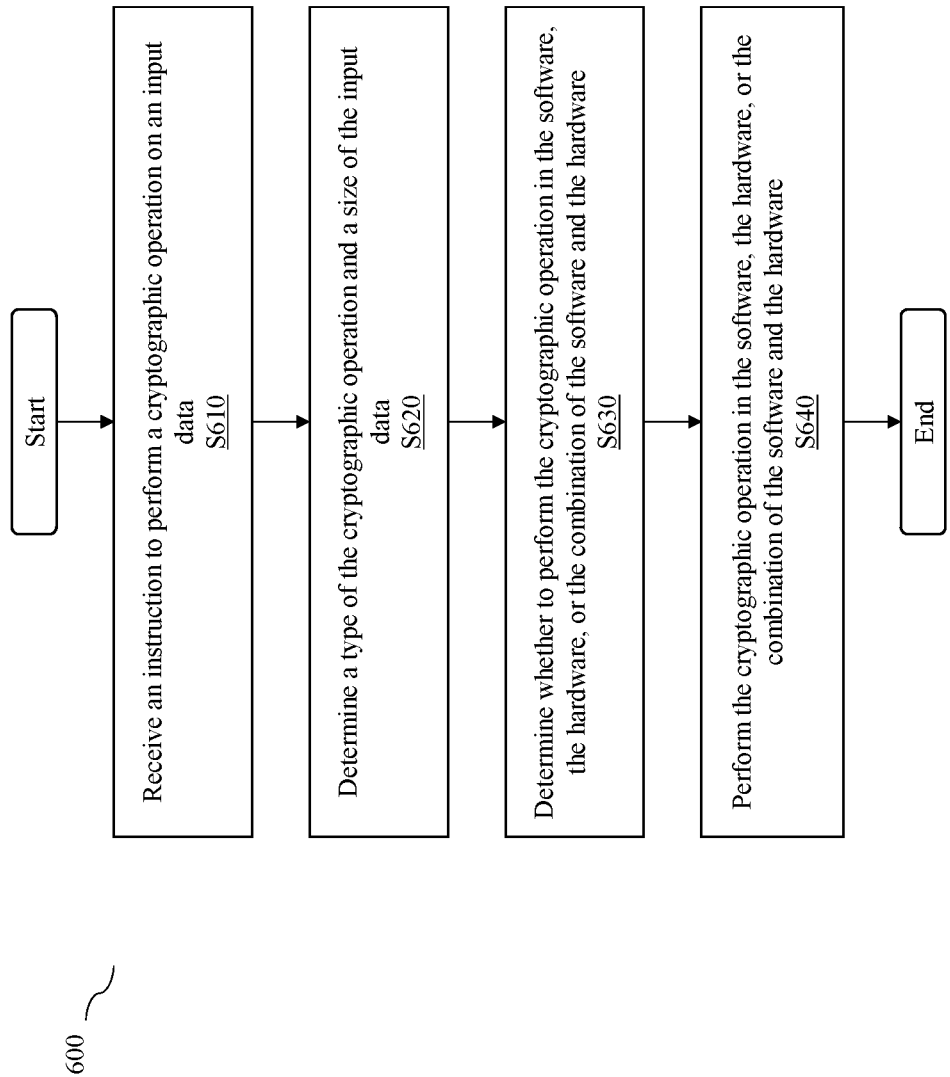
FIG. 6 illustrates a flow diagram of an example method for determining whether to perform a cryptographic operation in the software, the hardware, or the combination of the software and the hardware, according to one or more embodiments.

Example Operations for Determining Whether to Perform a Cryptographic Operation in the Software, the Hardware, or the Combination of the Software and the Hardware in the Present Disclosure FIG. 6 illustrates a flow diagram of an example method 600 for determining whether to perform a cryptographic operation in the software, the hardware, or the combination of the software and the hardware, according to one or more embodiments. One or more operations of method 600 may be performed after method 300, and may be performed by at least one processor (e.g., processor 220) of the COO system.

As illustrated in FIG. 6, at operation S610, the at least one processor may be configured to receive an instruction to perform a cryptographic operation on an input data. According to embodiments, the at least one processor may be configured to receive an instruction to perform a cryptographic operation on an input data from a user equipment, a server, and the like associated with the OOC system. For example, the user may provide an instruction to encrypt a data. The method then proceeds to operation S620.

At operation S620, the at least one processor may be configured to determine a type of the cryptographic operation and a size of the input data. For example, the at least one processor may be configured to determine that the type of the cryptographic operation (which is to be performed according to the instructions received during operation S610) is the cryptographic operation executing the encryption algorithm, and that the size of the input data is 1 megabyte.

It may be understood that the at least one processor may also be configured to determine any additional parameters related to performing the cryptographic operation, such as safety relevance, and the like. It may also be understood that each of the plurality of types of cryptographic operations may have a ranking score consisting of: complexity; security protocol; library support, hardware support, own implementation; and the like. The method then proceeds to operation S630.

At operation S630, the at least one processor may be configured to determine whether to perform the cryptographic operation in the software, the hardware, or the combination of the software and the hardware. According to embodiments, the at least one processor may be configured to determine whether to perform the cryptographic operation in the software, the hardware, or the combination of the software and the hardware, based on at least the type of the cryptographic operation and the size of the input data determined during operation S620 as well as the results stored in the memory during operation S530 in method 500.

For example, if the type of the cryptographic operation (which is to be performed according to the instructions received during operation S610) is the cryptographic operation executing the encryption algorithm and the size of the input data is 1 megabyte, and if the calibration file (i.e., stored results) specify that the cryptographic operation executing the encryption algorithm with input data of 1 megabyte should be performed in the software, the at least one processor may be configured to determine that the cryptographic operation is to be performed in the software. The method then proceeds to operation S640.

At operation S640, the at least one processor may be configured to perform the cryptographic operation in the software, the hardware, or the combination of the software and the hardware. According to embodiments, the at least one processor may be configured to perform the cryptographic operation in the software, the hardware, or the combination of the software and the hardware, based on the determination during operation S630.

For example, if the at least one processor determines that the cryptographic operation is to be performed in the software during operation S630, the at least one processor may be configured to perform the cryptographic operation in the software.

It may be understood that the cryptographic operation may be performed under a Trusted Execution Environment (TEE), such that no data or keys are exposed to the normal world operating system.

Further, according to embodiments, the at least one processor may be configured to determine whether to perform the cryptographic operation in the software, the hardware, or the combination of the software and the hardware, additionally based on the ranking score, maximum size of input data supported by the hardware, and safety impact (maximum execution time) associated with the cryptographic operation. For example, a cryptographic operation with a small size input that needs to be AES may be performed in the hardware as the hardware is the best choice, whereas the same cryptographic operation with a larger size input may be performed in software due to a maximum execution time constraint. Accordingly, the COO system may be able to determine the most optimal location for performing cryptographic operations based on worst case execution time, thereby making this safety relevant.

Example Flow of Instructions in the Present Disclosure

Figure 7:
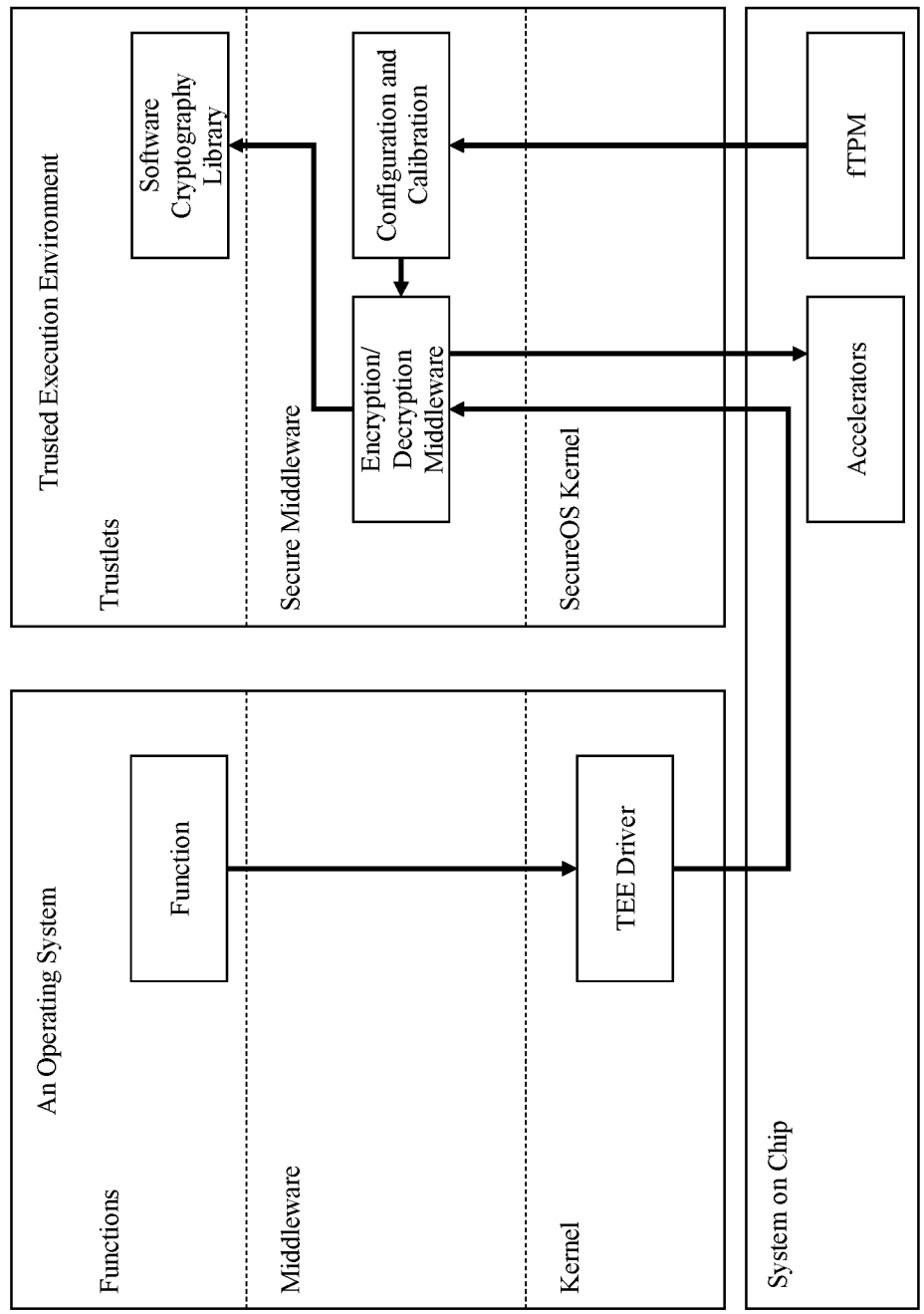
FIG. 7 illustrates an example of a flow of instructions within the Cryptographic Operation Optimization (COO) System, according to one or more embodiments.

FIG. 7 illustrates an example of a flow of instructions within the COO system, according to one or more embodiments.

As shown in FIG. 7, a Function of an Operating System may be configured to transmit an instruction to a Trusted Execution Environment (TEE) Driver to optimize cryptographic operations given the currently installed hardware and software. In particular, cryptographic operations must be done securely and safely, which requires the use of the TEE that is provided by ARM v8 and forward compliant hardware. The TEE is a special mode that is present in, for example, ARM compliant processors (equivalent technologies are Intel SGX or Microsoft's Pluton Core), which allows the associated System on Chip (SoC) to support any number and type of cryptographic operations without requiring any specific hardware accelerator.

On ARM compliant processors when a command is to be run or executed within the TEE, the processor does a context switch to a higher privileged mode where the command is then executed, the response is signed (attested) by the operating system running in the TEE and returned to the calling function.

In particular, the Trusted Execution Environment Driver may transmit an instruction to its Encryption/Decryption Middleware. The Encryption/Decryption Middleware may be hardware and software contextually aware, where the Encryption/Decryption Middleware may be configured to obtain and read data from Calibration and Configuration (e.g., calibration file and/or configuration file), and determine the amount of time for performing the cryptographic operation in the software, the hardware, and the combination of the software and the hardware, as well as determine whether the cryptographic operation should be performed in the software, the hardware, or the combination of the software and the hardware.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
   a memory storage storing computer-executable instructions; and
   at least one processor communicatively coupled to the memory storage, wherein the at least one processor is configured to execute the instructions to:
   execute a first test to determine a first amount of time for sequentially performing, using a plurality of sizes of input data, one or more types of cryptographic operations in a software of the system, execute a second test to determine a second amount of time for sequentially performing, using the plurality of sizes of input data, the one or more types of cryptographic operations in a hardware of the system, and execute a third test to determine a third amount of time for sequentially performing, using the plurality of sizes of input data, the one or more types of cryptographic operations in a combination of the software and the hardware; and
   determine, for each of the one or more types of cryptographic operations, whether a respective one of the one or more types of cryptographic operations should be performed in the software, the hardware, or the combination of the software and the hardware based on the determined first amount of time, the second amount of time, and the third amount of time for performing the respective one of the one or more types of cryptographic operations.

2. The system according to claim 1, wherein the one or more types of cryptographic operations comprise a cryptographic operation executing an encryption algorithm, a cryptographic operation executing a decryption algorithm, a cryptographic operation executing a hash algorithm, a cryptographic operation executing a derive key algorithm, and a cryptographic operation executing a generate algorithm.

3. The system according to claim 1, wherein the at least one processor is configured to execute the instructions to determine whether the respective one of the one or more types of cryptographic operations should be performed in the software, the hardware, or the combination of the software and the hardware by:
   comparing, for each of the one or more types of cryptographic operations at each of the plurality of sizes of input data, the first amount of time for performing the respective one of the one or more types of cryptographic operations in the software of the system, with the second amount of time for performing the respective one of the one or more types of cryptographic operations in the hardware, and with the third amount of time for performing the respective one of the one or more types of cryptographic operations in the combination of the software and the hardware; and
   determining, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

4. The system according to claim 3, wherein the at least one processor is further configured to execute the instructions to store results of the determining whether the respective one of the one or more types of cryptographic operations should be performed in the software, the hardware, or the combination of the software and the hardware.

5. The system according to claim 4, wherein the at least one processor is further configured to execute the instructions to determine whether to perform a cryptographic operation in the software, the hardware, or the combination of the software and the hardware, based on at least a type of the cryptographic operation, a size of input data, and the stored results.

6. The system according to claim 1, wherein the at least one processor is further configured to execute the instructions to perform a cryptographic operation in the software, the hardware, or the combination of the software and the hardware under a Trusted Execution Environment (TEE).

7. A method, comprising:
   executing a first test for determining a first amount of time for sequentially performing, using a plurality of sizes of input data, one or more types of cryptographic operations in a software of a system, executing a second test for determining a second amount of time for sequentially performing, using the plurality of sizes of input data, the one or more types of cryptographic operations in a hardware of the system, and executing a third test for determining a third amount of time for sequentially performing, using the plurality of sizes of input data, the one or more types of cryptographic operations in a combination of the software and the hardware; and
   determining, for each of the one or more types of cryptographic operations, whether a respective one of the one or more types of cryptographic operations should be performed in the software, the hardware, or the combination of the software and the hardware based on the determined first amount of time, the second amount of time, and the third amount of time for performing the respective one of the one or more types of cryptographic operations.

8. The method according to claim 7, wherein the one or more types of cryptographic operations comprise a cryptographic operation executing an encryption algorithm, a cryptographic operation executing a decryption algorithm, a cryptographic operation executing a hash algorithm, a cryptographic operation executing a derive key algorithm, and a cryptographic operation executing a generate algorithm.

9. The method according to claim 7, wherein the determining whether the respective one of the one or more types of cryptographic operations should be performed in the software, the hardware, or the combination of the software and the hardware comprises:
   comparing, for each of the one or more types of cryptographic operations at each of the plurality of sizes of input data, the first amount of time for performing the respective one of the one or more types of cryptographic operations in the software of the system, with the second amount of time for performing the respective one of the one or more types of cryptographic operations in the hardware, and with the third amount of time for performing the respective one of the one or more types of cryptographic operations in the combination of the software and the hardware; and
   determining, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

10. The method according to claim 9, further comprising storing results of the determining whether the respective one of the one or more types of cryptographic operations should be performed in the software, the hardware, or the combination of the software and the hardware.

11. The method according to claim 10, further comprising determining whether to perform a cryptographic operation in the software, the hardware, or the combination of the software and the hardware, based on at least a type of the cryptographic operation, a size of input data, and the stored results.

12. The method according to claim 7, further comprising performing a cryptographic operation in the software, the hardware, or the combination of the software and the hardware under a Trusted Execution Environment (TEE).

13. A non-transitory computer-readable recording medium having recorded thereon instructions executable by at least one processor to cause the at least one processor to perform a method comprising:
   execute a first test for determining a first amount of time for sequentially performing, using a plurality of sizes of input data, one or more types of cryptographic operations in a software of a system, executing a second test for determining a second amount of time for sequentially performing, using the plurality of sizes of input data, the one or more types of cryptographic operations in a hardware of the system, and executing a third test, using the plurality of sizes of input data, for determining a third amount of time for sequentially performing, using the plurality of sizes of input data, the one or more types of cryptographic operations in a combination of the software and the hardware; and
   determining, for each of the one or more types of cryptographic operations, whether a respective one of the one or more types of cryptographic operations should be performed in the software, the hardware, or the combination of the software and the hardware based on the determined first amount of time, the second amount of time, and the third amount of time for performing the respective one of the one or more types of cryptographic operations.

14. The non-transitory computer-readable recording medium according to claim 13, wherein the one or more types of cryptographic operations comprise a cryptographic operation executing an encryption algorithm, a cryptographic operation executing a decryption algorithm, a cryptographic operation executing a hash algorithm, a cryptographic operation executing a derive key algorithm, and a cryptographic operation executing a generate algorithm.

15. The non-transitory computer-readable recording medium according to claim 13, wherein the determining whether the respective one of the one or more types of cryptographic operations should be performed in the software, the hardware, or the combination of the software and the hardware comprises:
   comparing, for each of the one or more types of cryptographic operations at each of the plurality of sizes of input data, the first amount of time for performing the respective one of the one or more types of cryptographic operations in the software of the system, with the second amount of time for performing the respective one of the one or more types of cryptographic operations in the hardware, and with the third amount of time for performing the respective one of the one or more types of cryptographic operations in the combination of the software and the hardware; and
   determining, for each of the one or more types of cryptographic operations at each of the plurality of sizes of input data, whether the respective one of the one or more types of cryptographic operations should be performed in the software, the hardware, or the combination of the software and the hardware based on which of the first amount of time, the second amount of time, and the third amount of time that has a lowest value.

16. The non-transitory computer-readable recording medium according to claim 15, wherein the method further comprises storing results of the determining whether the respective one of the one or more types of cryptographic operations should be performed in the software, the hardware, or the combination of the software and the hardware.

17. The non-transitory computer-readable recording medium according to claim 16, wherein the method further comprises determining whether to perform a cryptographic operation in the software, the hardware, or the combination of the software and the hardware, based on at least a type of the cryptographic operation, a size of input data, and the stored results.

* * * * *